Patented June 10, 1924.

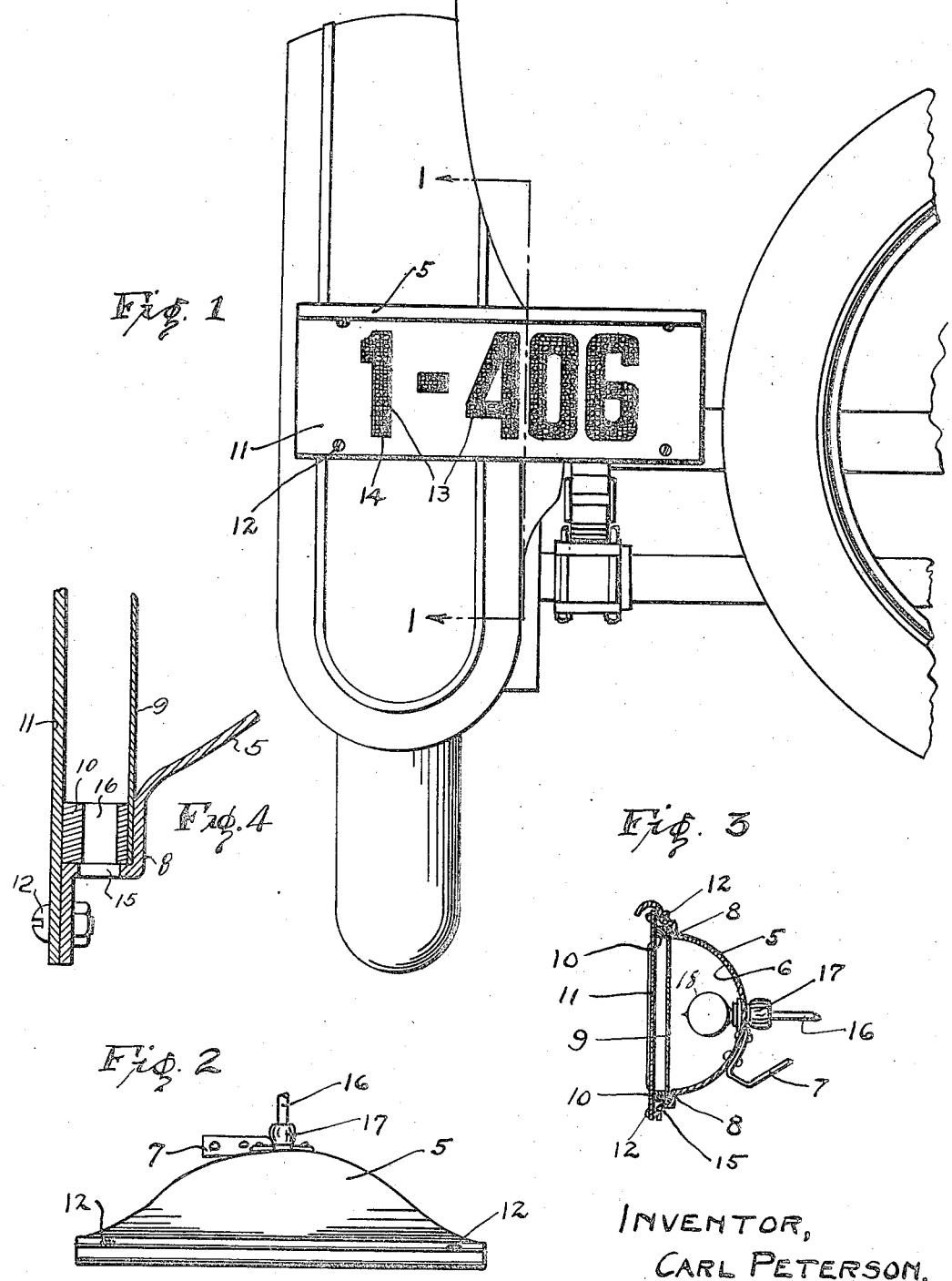

1,497,282

UNITED STATES PATENT OFFICE.

CARL PETERSON, OF NEWCASTLE, INDIANA.

VEHICLE LICENSE-PLATE LAMP.

Application filed June 19, 1923. Serial No. 646,406.

*To all whom it may concern:*

Be it known that I, CARL PETERSON, a citizen of the United States, residing at Newcastle, in the county of Henry and State of Indiana, have invented new and useful Improvements in Vehicle License-Plate Lamps, of which the following is a specification.

My invention relates to a means of holding and illuminating vehicle license plates such as may be required on vehicles in general and providing thereby a distinctive warning signal.

With the increasing of the amount of traffic on the public highways accidents happen frequently due to the ordinary signal lamps of moving vehicles being confused with stationary warning signals after night fall, and in those instances where the party at fault of such accidents leaves the scene of the accident, witnesses are unable to ascertain party's license number which would lead to his apprehension, due to lack of sufficient light employed in the usual display of such license plate.

It is therefore the object of my invention, first, to insure the distinct readability of the characters contained on such license plates from an appreciable distance under the varying light conditions of daylight and darkness, and second, to provide a distinctive signal light in combination with such license plate illumination without the requirement of additional parts.

I attain these and other objects as hereinafter may be mentioned by the means illustrated in the accompanying drawing, in which—

Fig. 1, is an elevation showing the license plate lamp as attached to a motor vehicle; Fig. 2, a plan view; Fig. 3, a vertical section taken on the line 1—1; and Fig. 4, an enlarged sectional view, being the same as the lower portion of Fig. 3, to show the means of providing drainage from between the license plate and its lens.

Like numerals refer to like parts throughout the several views.

The body 5, preferably made of sheet metal, with an inner reflecting surface, 6, is supported and attached to vehicle by bracket 7. Formed integral with body 5 are the shoulders 8 which serve as a stop for the color lens 9. Color lens 9, of some transparent material, preferably pyralin, is held against shoulders 8 by pressure on spacing ring 10 exerted by license plate 11 when such license plate is secured to body 5 by means such as bolts 12 the spacing ring 10 is provided with a number of holes 16 through its lower section as in Fig. 4 to provide drainage from between the plate 11 and the lens.

Color lens 9, may be any color desired depending on location of the license plate holder on front, side, or rear of vehicle. Red is in commonly accepted use for rear warning light.

Mounted in suitable base or receptacle 17, attached to body 5, is lamp 18, supplied with electric current through wire 16. License plate 11 is one form of license plate prescribed for particular vehicles. The customary characters 13, painted, embossed, or otherwise formed, are perforated by a series of holes 14, preferably one-eighth inch or more in diameter, such that the characters appear distinctly as such by passage of rays of light from lamp 18 through color lens 9 and through perforations. The characters will appear to the observer in the color corresponding to that of the color lens. In the case of the license plate being displayed on the rear of the vehicle such color lens would be red and the characters would appear as red and no other red warning signal would be required.

Body 5 is provided with drain holes or passages 15, to allow discharge of such water and matter as may enter between plate 11 and lens 9. Body 5 may take any shape desirable depending upon the desired conformation to the vehicle to which it is to be attached.

My invention is capable of numerous changes in construction, some of which I have here specifically mentioned, also, in its proportions, and I do not desire to be limited to the precise form shown, or any more than is shown by the appended claim.

Having fully described my invention what I claim as new and desire to secure by Letters Patent is:—

The combination, with a vehicle, of a lamp body attached to the vehicle, a single lamp within the lamp body located at the approximate center of the lamp body, a detachable license plate having a series of characters thereon closely perforated, a detachable color lens of the approximate size of the license plate, a spacing ring between the license plate and the color lens, said ring holding the color lens against shoulders formed in the lamp body by means of bolts passing through the license plate and the wall of the lamp body, drain holes between the color lens and the license plate through the spacing ring and the lamp body, and a wall within the lamp body for reflecting rays of light from the lamp horizontally through the perforations of the license plate.

Signed at Newcastle, Indiana, this the 12th day of June, 1923.

CARL PETERSON.